(12) United States Patent
Dibia et al.

(10) Patent No.: US 12,254,293 B2
(45) Date of Patent: *Mar. 18, 2025

(54) CODING ACTIVITY TASK (CAT) EVALUATION FOR SOURCE CODE GENERATORS

(71) Applicant: Microsoft Technology Licensing, LLC, Redmond, WA (US)

(72) Inventors: Victor Chukwuma Dibia, Santa Clara, CA (US); Adam Fourney, Woodinville, WA (US); Forough Poursabzi Sangdeh, Manhasset, NY (US); Saleema Amin Amershi, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,836

(22) Filed: Oct. 6, 2023

(65) Prior Publication Data
US 2024/0045660 A1 Feb. 8, 2024

Related U.S. Application Data

(63) Continuation of application No. 17/726,413, filed on Apr. 21, 2022, now Pat. No. 11,815,934.

(51) Int. Cl.
*G06F 8/35* (2018.01)
*G06F 8/36* (2018.01)
(Continued)

(52) U.S. Cl.
CPC .............. *G06F 8/35* (2013.01); *G06F 8/36* (2013.01); *G06F 11/3688* (2013.01)

(58) Field of Classification Search
None
See application file for complete search history.

(56) References Cited

U.S. PATENT DOCUMENTS

2021/0255847 A1* 8/2021 Jean-Louis .............. G06F 8/63
2022/0036236 A1* 2/2022 Yu ....................... G06N 20/00

OTHER PUBLICATIONS

Zhu, "Research on Deep Learning Based Code Generation from Natural Language Description", 2020, IEEE (Year: 2020).*

(Continued)

*Primary Examiner* — Hossain M Morshed
(74) *Attorney, Agent, or Firm* — Rainier Patents, P.S.

(57) ABSTRACT

Solutions for evaluating source code generators use offline and online evaluation stages. Offline evaluation includes separating each of a plurality of input passages of software code into a plurality of constituent blocks. Each code generator (of a plurality of code generators) generates an equivalent block corresponding to each constituent block. A coding score is determined for each equivalent block (for each code generator), and the coding scores are aggregated across the equivalent blocks to provide an aggregate score for each code generator. A ranking of the aggregate scores is used to down-select to a fewer number of code generators for online evaluation. For this stage, the code generators output passages of software code, and user acceptance of the code generators' outputs may be used for further ranking and down-selection. Some examples weight the coding score according to a code utility estimate of the constituent blocks for which equivalent blocks are generated.

20 Claims, 10 Drawing Sheets

(51) Int. Cl.
*G06F 11/36* (2006.01)
*G06F 11/3668* (2025.01)

(56) References Cited

OTHER PUBLICATIONS

Poesia, "Synchromesh: Reliable Code Generation From Pre-Trained Language Models", 2022, arXiv:2201 (Year: 2022).*

* cited by examiner

CODING ACTIVITY TASK (CAT) EVALUATION FOR SOURCE CODE GENERATORS

CROSS-REFERENCE TO RELATED APPLICATION

This application is a continuation application of and claims priority to U.S. patent application Ser. No. 17/726,413, entitled "CODING ACTIVITY TASK (CAT) EVALUATION FOR SOURCE CODE GENERATORS," filed on Apr. 21, 2022, the disclosure of which is incorporated herein by reference in its entirety.

BACKGROUND

Advances in artificial intelligence (AI), specifically in autoregressive large language models that use deep learning to produce human-like text, have enabled new applications (e.g., code generators) that generate software source code for developers and improve productivity. For example, a code generation model (code generator) that has been trained using a large language model architecture is able to intake a description of a function (and any additional context e.g., surrounding functions or files) and write multiple lines of code to perform that function. Unfortunately, evaluation of code generator systems is challenging, due to the dearth of validated metrics and the cost of labeled data.

Current evaluation schemes that rely on similarity between generated code and ground truth (e.g., prior-existing code that had been written by a human) do not capture notions of functional equivalence, correctness, or complexity (e.g., cognitive difficulty, or computational complexity), and are thus not human-centric metrics. Current evaluation schemes that rely on pass/fail functional testing require execution (with security implications) and have overly coarse granularity (e.g., the complete function), and so do not provide the insight necessary to differentiate between a nearly correct result (e.g., only a single line, out of dozens, that is in error) and a plethora of errors. Other current evaluation schemes that measure the acceptance or survival of a generated function are more human centric but also fail to capture notions of functional equivalence, correctness, or complexity. Therefore, both selecting a well-performing code generator, and improving the machine learning (ML) training of pools of code generators remains time-consuming and expensive.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Solutions for evaluating source code generators include: separating, by a processor, each of a plurality of input passages of software code into a plurality of constituent blocks; for at least one constituent block of each plurality of constituent blocks, generating, with each code generator of a first plurality of code generators, an equivalent block, thereby producing a plurality of equivalent blocks corresponding to each code generator; determining, for each code generator, for each equivalent block in the plurality of equivalent blocks corresponding to the code generator, a first coding score; aggregating, for each code generator, the first coding scores, across the plurality of equivalent blocks corresponding to the code generator, into a first aggregate score for the code generator; based on at least a ranking of the first aggregate scores for the first plurality of code generators, selecting a second plurality of code generators from among the first plurality of code generators, the second plurality of code generators having a smaller count than the first plurality of code generators; and generating, with each code generator of the second plurality of code generators, an output passage of software code.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
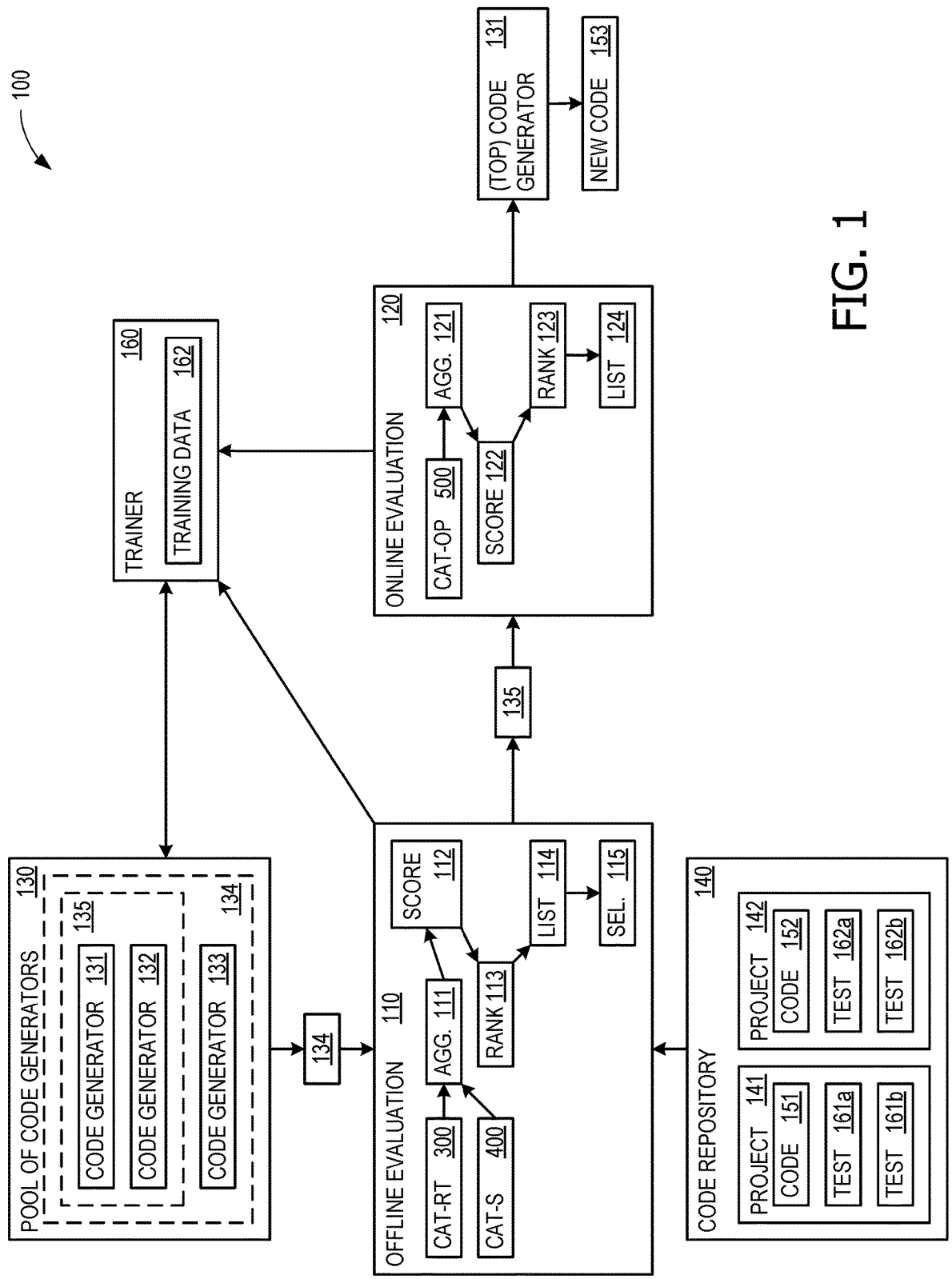
FIG. 1 illustrates an example arrangement that advantageously provides coding activity task (CAT) evaluation for source code generators.

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

Solutions for evaluating source code generators use offline and online evaluation stages. Offline evaluation includes separating each of a plurality of input passages of software code into a plurality of constituent blocks. Each code generator (of a plurality of code generators) generates an equivalent block corresponding to each constituent block. A coding score is determined for each equivalent block (for each code generator), and the coding scores are aggregated across the equivalent blocks to provide an aggregate score for each code generator. In some examples, a ranking of the aggregate scores is used to down-select to a fewer number of code generators for online evaluation. For this stage, the code generators output passages of software code, and user acceptance of the code generators' outputs may be used for further ranking and down-selection. Some examples weight the coding score according to a code utility estimate (which may be based on learned human centric measures of code as operationalized by dimensions such as complexity, readability, bug probability, and others) of the constituent blocks for which equivalent blocks are generated.

Aspects of the disclosure provide for more human-centric evaluation of code generators by scoring code generator performance on constituent blocks (rather than entire functions), and aggregating scores (based on human centric measures mentioned above). In some examples, online evaluation (i.e., determining acceptance rates) is used in tandem with offline evaluation, although the online evaluation is limited to code generators that achieved superior scores in the offline testing.

Solutions are provided that go beyond function scopes, assign credit in a more granular manner, and encode human/task properties and online metrics that account for task complexity and human cognitive requirements. A coding activity task (CAT) approach represents a human-centric evaluation of code generators. In some examples, a CAT score is derived as follows: (1) parse target tasks (functions or classes) into small extracted blocks using grammar parsers with corresponding task labels; (2) obtain completion for each block (equivalent block); (3) derive a score for each task in one or both of two ways: (a) replace extracted constituent blocks with equivalent block in a target function and compute a score based on unit test result, and (b) compare the equivalent blocks with the extracted constituent blocks using a semantic similarity engine to compute a score based on similarity.

The first scoring option operates on constituent blocks, rather than an entire discovered function. This permits attributing a failure of the test to the equivalent block (because presumably the unmodified function would pass). The second scoring option determination does not rely on executing any code or the availability of unit tests. The final offline CAT score is the (weighted, in some examples) average of CAT scores for all small scope blocks.

This offline CAT score may then be used to evaluate the quality of each code generator, allowing prioritization of a smaller number of code generators for online evaluation. This approach introduces a cost-effective label-free solution for fine-grained human centric evaluation of code generators, with flexible granularity. Examples use code utility-based weights and provides a low effort path to scaling offline evaluation to multiple languages.

FIG. 1 illustrates an example arrangement that advantageously provides CAT evaluation for source code generators. In some examples, arrangement 100 is implemented using one or more examples of computing device 900 of FIG. 9. In arrangement 100, a first plurality of code generators 134 in a pool of code generators 130 is evaluated by an offline evaluation 110 that leverages baseline (e.g., human-authored) source code from projects in a source code repository 140, for example, from a project 141 and a project 142. First plurality of code generators 134 is down-selected, based on performance into a smaller second plurality of code generators 135 that is passed to an online evaluation 120.

A top-performing code generator 131 is identified by online evaluation 120, and used to generate a new output passage of software code 153 in support of a coding project. This process is considerably faster than a user trying multiple code generators to select the best-performing one manually, and produces superior results (e.g., a superior output passage of software code 153) when compared with selection approaches that do not use human-centric evaluation.

As illustrated, first plurality of code generators 134 includes a code generator 131, a code generator 132, and a code generator 133. Although only three code generators are shown, it should be understood that some examples may have dozens or hundreds (or more) code generators in first plurality of code generators 134. Second plurality of code generators 135 includes only code generator 131 and code generator 132, although some examples may include a larger number.

Project 141 has a passage of software code 151, a test 161a and a test 161b. Project 142 has a passage of software code 152, a test 162a and a test 162b. Tests 161a-162b may be unit tests. It should be understood that a different number of tests may be present in different projects.

Offline evaluation 110 uses a CAT replace and test strategy (CAT-RT) 300 that replace constituent blocks of passage of software code 151 and/or 152 with equivalent blocks, and computes a score based on test results. Further detail on CAT-RT 300 is provided in relation to FIGS. 2, 3A, and 3B. Offline evaluation 110 also uses a CAT similarity strategy (CAT-S) 400 to compare equivalent blocks with constituent blocks using a semantic similarity engine 401. Further detail on CAT-S 400 is provided in relation to FIGS. 2 and 4.

A CAT-RT/S aggregator 111 aggregates code generator scores across the equivalent blocks of different passage of software code into a first aggregate score 112 for each code generator. Additional detail is provided in relation to FIG. 6. In some examples, a ranking engine 113 optionally ranks first plurality of code generators 134 by their first aggregate scores 112 into a ranking 114 (a ranked list), and a selection logic 115 selects the top N (e.g., N=2, in some examples), to pass along to online evaluation 120 as second plurality of code generators 135. That is, second plurality of code generators 135 is a down-selected version of first plurality of code generators 134.

Figure 5:
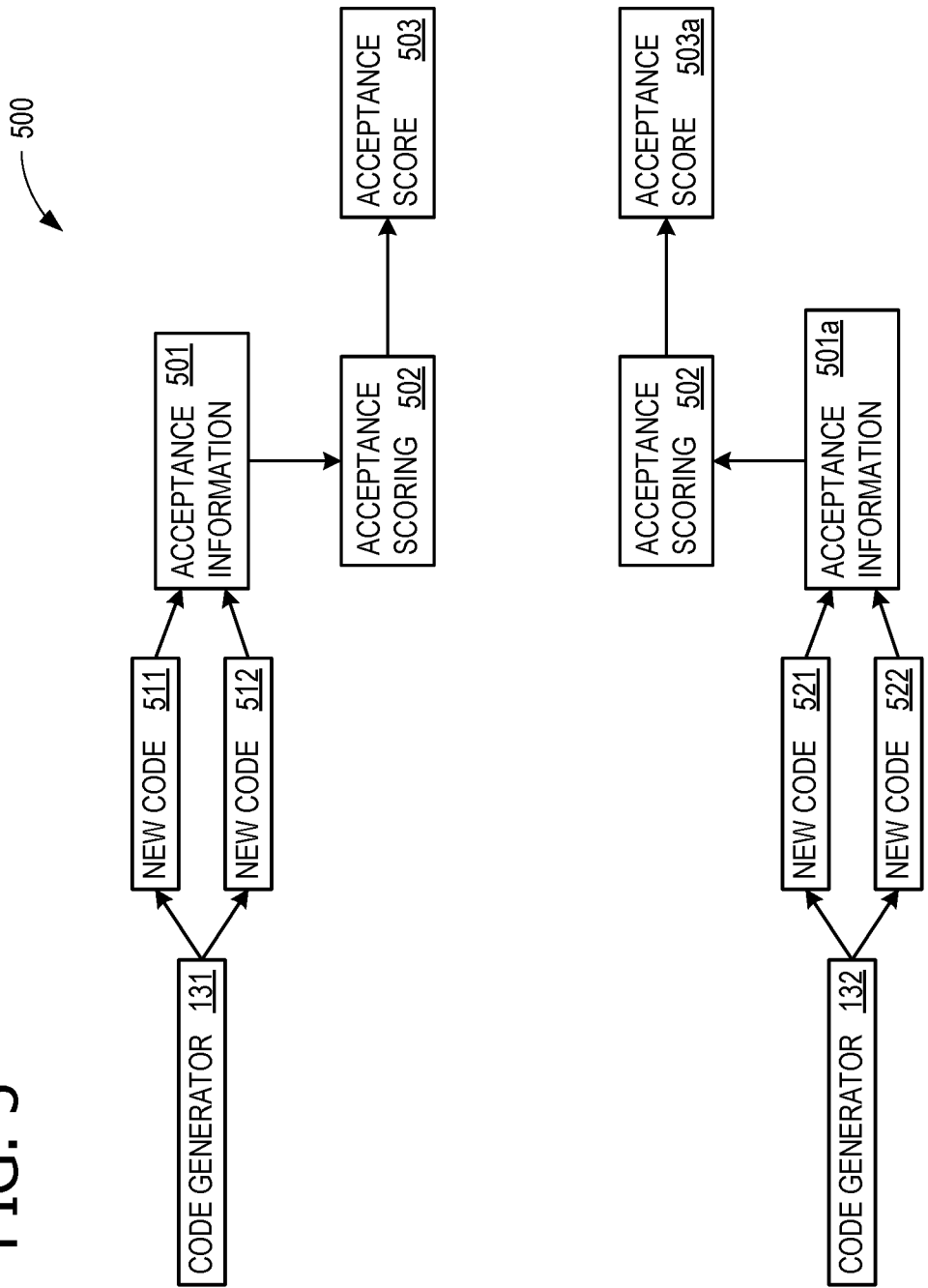
FIG. 5 illustrates an example of CAT online performance evaluation (CAT-OP), which is used in some examples of the arrangement of FIG. 1.

Online evaluation 120 uses a CAT online performance strategy (CAT-OP) 500, which is described in further detail in relation to FIG. 5. CAT-OP 500 produces acceptance scores that may be aggregated (in some examples) with offline results (e.g., first aggregate score 112) by an offline/online aggregator 121 into a second aggregate score 122. See FIG. 5 for further detail on acceptance scores. A ranking engine 123 ranks second plurality of code generators 135 by their second aggregate scores 122 into a ranking 124 (a ranked list), enabling identification of the top code generator (e.g., code generator 131, in the illustrated example).

In some examples, CAT OP labels and scores for coding sessions are applied as vector representations of coding sessions and used for downstream tasks such as performance monitoring and anomaly detection. The vector representation may be implemented as follows: Given N different CAT block types, a session is represented as an N-sized vector, in which each position corresponds to the count of each block type in the session.

Code generators in pool of code generators 130 are trained by a machine learning (ML) trainer 160, using training data 162. Because training data 162 is so expensive, feedback from the CAT evaluations, in offline evaluation 110 and online evaluation 120 is leveraged by trainer 160 to further train code generators in pool of code generators 130. This is enabled by the finer degree of granularity provided by the disclosed offline evaluation 110 solutions, which enables visibility into the types of constituent blocks for which code generator performance is weakest.

Figure 2:
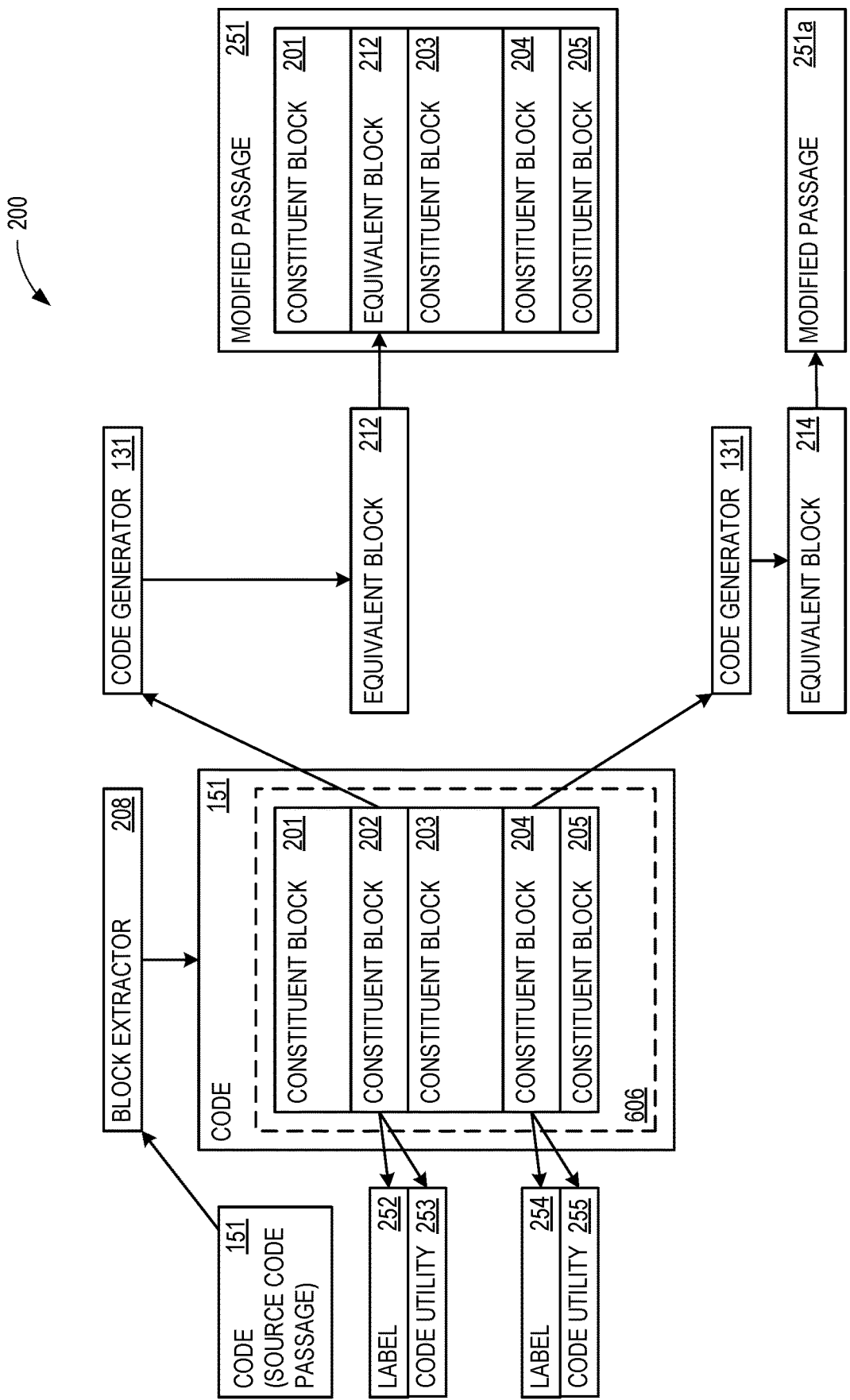
FIG. 2 illustrates separation of an input passage of software code into a plurality of constituent blocks, and generation of an equivalent block, as may occur in examples of the arrangement of FIG. 1.

FIG. 2 illustrates a replacement process 200 that include separation of input passage of software code 151 into a plurality of constituent blocks 606 (see FIG. 6 for further detail), and generation of an equivalent block 212. Input passage of software code 151 is passed to a block extractor 208 that breaks large functions into multiple blocks, for example, by using grammar parsers. In the illustrated example, input passage of software code 151 is broken into five constituent blocks: a constituent block 201, a constituent block 202, a constituent block 203, a constituent block 204, and a constituent block 205. A task label 252 is created for constituent block 202, and a task label 254 is created for constituent block 204. (Task labels may also be created for the other constituent blocks.

Additionally, in some examples, a code utility is determined for at least the constituent blocks for which a corresponding equivalent block will be generated by a code generator. Thus, a code utility 253 is determined for constituent block 202, and a code utility label 255 is determined for constituent block 204. Code utility 253 and 255 will be used to determine weights to apply when aggregating code generator scores (e.g., weights 630 of FIG. 6), so that more complex blocks are weighted in the final scores. Weighting options include weighting higher complexity more heavily, weighting by frequency of occurrence in a distribution of tasks, and/or weighting according to an expected cost of an error in the corresponding portion of code (i.e., criticality).

Code utility is not just lines of code alone, but instead may include additional proxies for complexity, such as the number of reported bugs per line, the number of requested changes per line, and other metrics. Such other metrics may include how often a task is associated with stack traces and errors, build failures, readability, naturalness, and other metrics. Whereas assignment statements and arithmetic operations may be deemed simple, error handling instructions may be deemed to have higher complexity.

In the illustrated example, constituent block 202 and constituent block 204 are selected for generation of an equivalent block 212 and an equivalent block 214, respectively, by at least code generator 131. That is, code generator 131 is instructed to write (generate) an equivalent block 212 that performs the same task as, and thus may be substituted for, constituent block 202. Additionally, code generator 131 is instructed to write (generate) an equivalent block 214 that performs the same task as, and thus may be substituted for, constituent block 204. Different examples may select a different number of constituent blocks for which to generate corresponding equivalent blocks.

Figure 3A:
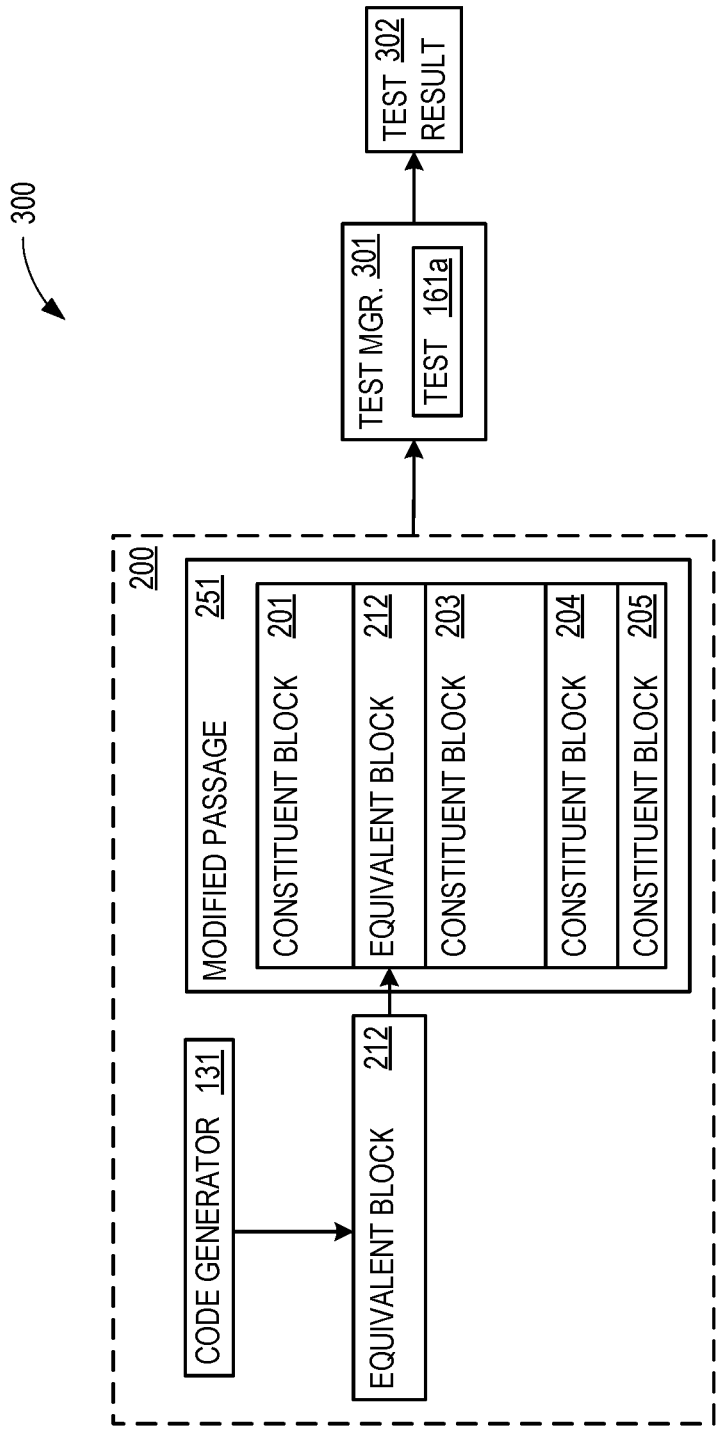
FIGS. 3A and 3B illustrate examples of CAT replace and test evaluation (CAT-RT), which are used in some examples of the arrangement of FIG. 1.
Figure 3B:
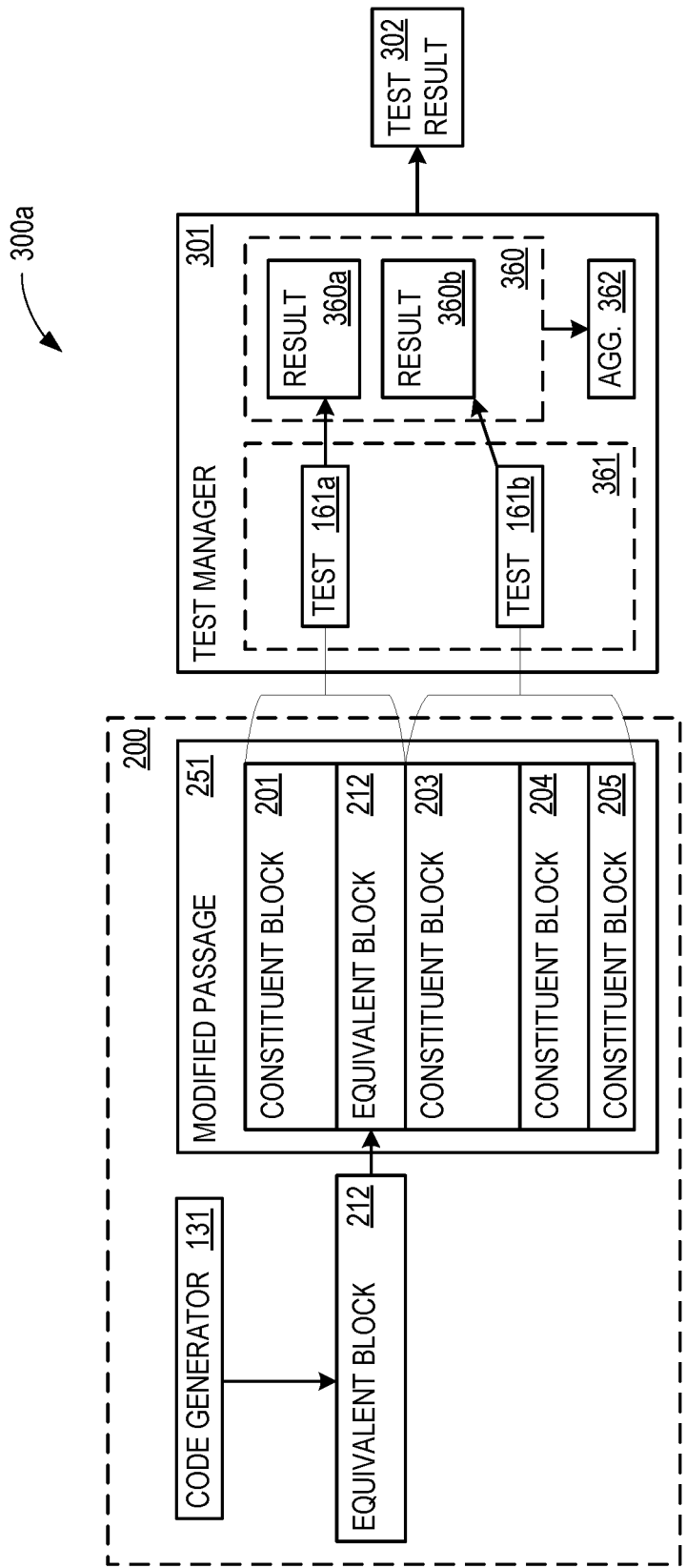

Equivalent block 212 is substituted for constituent block 202 in input passage of software code 151 to produce modified passage 251 that is tested in CAT-RT 300, as described in relation to FIGS. 3A and 3B. Equivalent block 214 is substituted for constituent block 204 in input passage of software code 151 to produce modified passage 251a that is also tested in CAT-RT 300, as described in relation to FIGS. 3A and 3B.

Replacement process 200 is performed for each code generator in first plurality of code generators 134, so that the role shown for code generator 131 is also performed by code generator 132 and code generator 133, each producing their own set of modified passages.

FIG. 3A illustrates an example of CAT-RT 300, in which modified passage 251 (produced by replacement process 200) is subject to a single test 161a by a test manager 301. This provides a single test result 302, which in some examples is a binary pass/fail. Some examples, however, may produce a scalar test result 302 or a multi-valued test result 302. CAT-RT 300 is performed for each combination of a code generator and a modified passage that is used in offline evaluation 110.

FIG. 3B illustrates an example of a CAT-RT 300a, in which modified passage 251 is subject to a plurality of tests 361 by test manager 301, specifically, test 161a and test 161b. This provides a plurality of test results 360, specifically test result 360a for test 161a and test result 360b for test 161b. In some examples, test 161a and test 161b test different blocks of modified passage 251. An aggregator 362 aggregates test result 360a and 360b into test result 302. Although CAT-RT 300a is described as using multiple tests, whereas CAT-RT 300 is described as using only a single test, offline evaluation 110 may generally use CAT-RT 300a interchangeably with CAT-RT 300.

Figure 4:
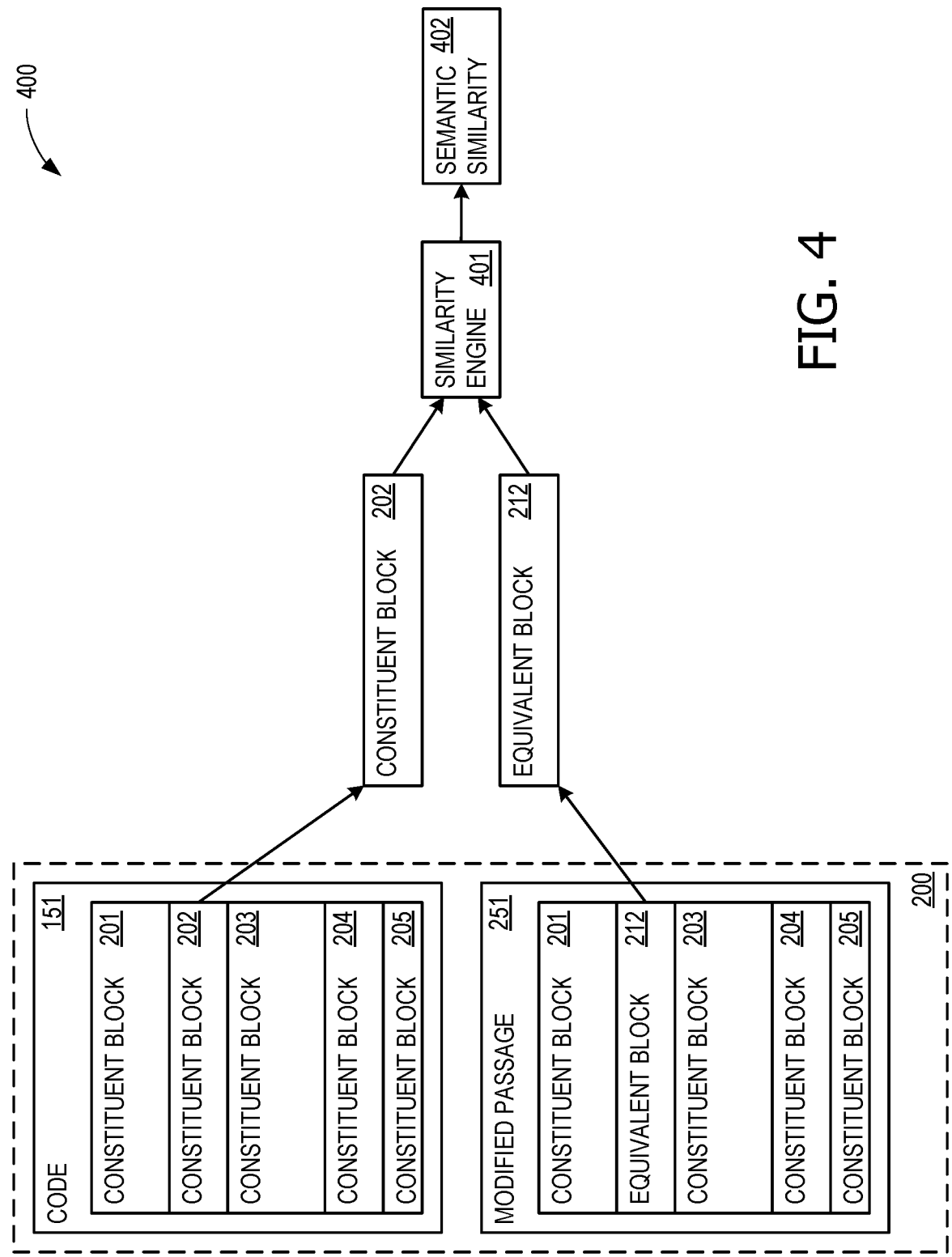
FIG. 4 illustrates an example of CAT similarity evaluation (CAT-S), which is used in some examples of the arrangement of FIG. 1.

FIG. 4 illustrates an example of CAT-S 400. A semantic similarity engine 401 compares constituent block 202 and equivalent block 212 for semantic similarity and assigns a semantic similarity 402 (e.g., a similarity score). Examples of semantic similarity measures include, but are not limited to, an edit distance, a learned neural similarity, bilingual evaluation understudy (BLEU), measure of software similarity (MOSS), and recall-oriented understudy for Gisting evaluation (ROUGE). Based on the particular raw metric used for semantic similarity, either lower or higher values indicate superior performance. A normalization renders the different raw metrics into a consistent scoring theme. A semantic similarity 402 is determined for each combination of a code generator and a modified passage that is used in offline evaluation 110.

FIG. 5 illustrates an example of CAT-OP 500 performed for each code generator in second plurality of code generators 135, specifically code generator 131 and code generator 132. In some examples of arrangement 100, CAT-OP 500 is optional. Code generator 131 is used to generate a new output passage of software code 511 and a new output passage of software code 512. Acceptance information 501 is determined, based on whether output passages of software code 511 and 512 are used or discarded by users working on software projects. Acceptance scoring 502 uses acceptance information 501 to determine an acceptance score 503 for code generator 131.

Similarly, code generator 132 is used to generate a new output passage of software code 521 and a new output passage of software code 522. Acceptance information 501a is determined, based at least partly on how software developers treat new output passages of software code 521 and 522 in other projects. For examples, the passages may be committed, saved (without committing), used as is, used after editing, or entirely discarded. Other metrics include time to accept, percentage of code written by the code generator, percentage of code edited after some amount of time, and survival without edits. In some examples, CAT OP labels and scores for coding sessions are applied as vector representations of coding sessions and used for downstream tasks such as performance monitoring and anomaly detection. The vector representation may be implemented as follows: Given N different CAT block types, a session is represented as an N-sized vector, in which each position corresponds to the count of each block type in the session. Acceptance scoring 502 uses acceptance information 501a to determine an acceptance score 503a for code generator 132.

Figure 6:
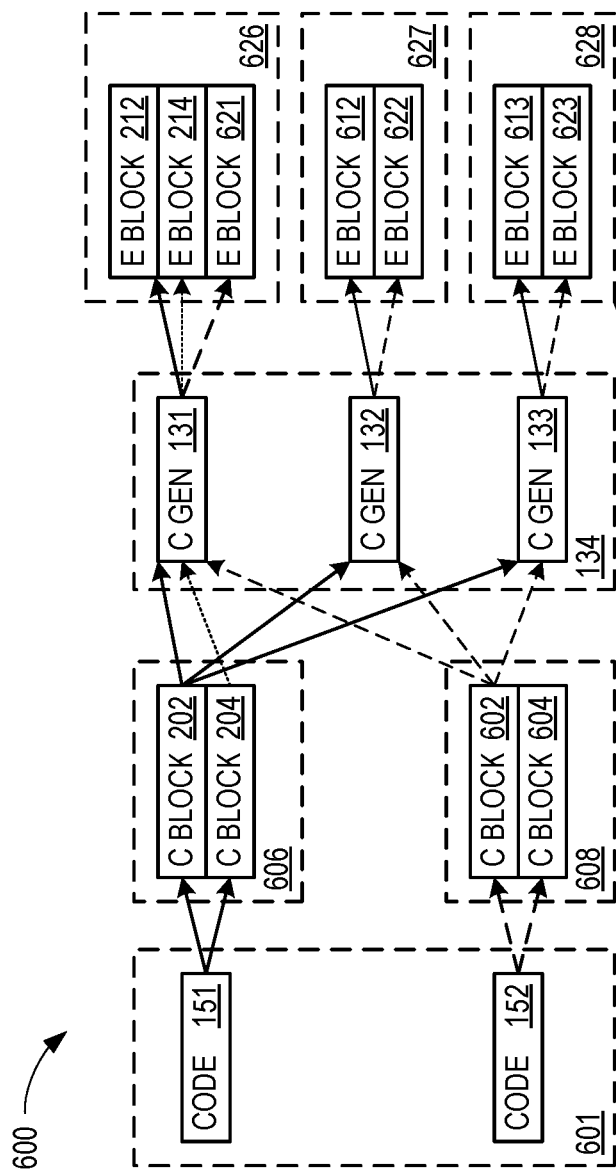
FIG. 6 shows a process flow of an example CAT evaluation, using CAT-RT, CAT-S, and CAT-OP, as may occur with some examples of the arrangement of FIG. 1.
Figure 6:
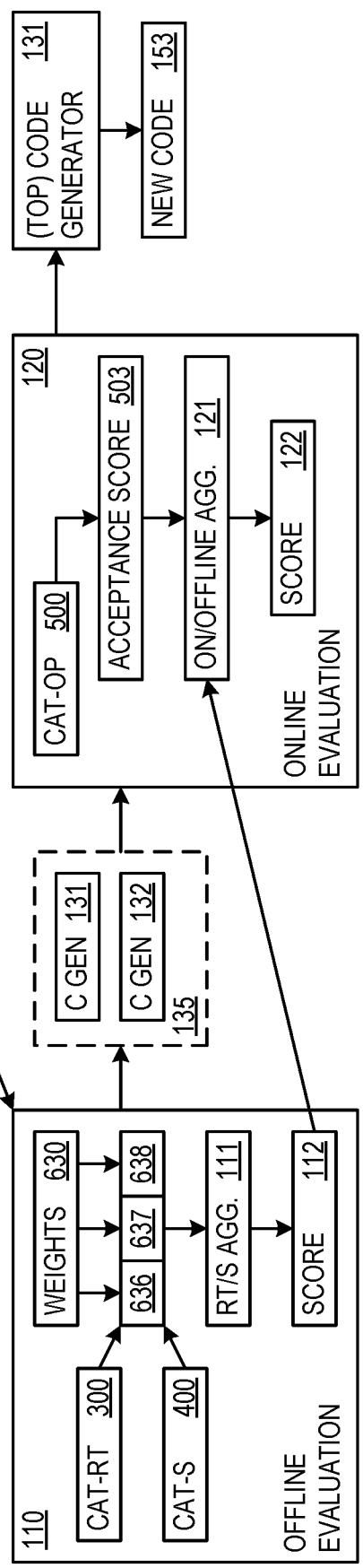

FIG. 6 shows a process flow 600, as may occur with some examples of arrangement 100. Process flow 600 ties together aspects of FIGS. 1-5. A plurality of input passages of software code 601, comprising passage of software code 151 and 152 is each separated into a plurality of constituent blocks. For example, passage of software code 151 is separated into plurality of constituent blocks 606, which comprises at least constituent blocks 202 and 204 (see also FIG. 2), and passage of software code 152 is separated into plurality of constituent blocks 608, which comprises at least constituent block 602 and constituent block 604.

At least one constituent block of each of plurality of constituent blocks 606 and 608 is provided to each code generator of first plurality of code generators 134 (which comprises code generators 131-133). This produces a plurality of equivalent blocks for each code generator. For example, code generator 131 generates equivalent block 212 for constituent block 202 and equivalent block 621 for constituent block 602; code generator 132 generates equivalent block 612 for constituent block 202 and equivalent block 622 for constituent block 602; and code generator 133 generates equivalent block 613 for constituent block 202 and equivalent block 623 for constituent block 602.

Additionally, code generator 131 generates equivalent block 214 for constituent block 204. Code generators 132 and 133 also generate respective equivalent blocks for constituent block 204, although for clarity of illustration, these are not shown.

Thus, there is a plurality of equivalent blocks for each code generator in first plurality of code generators 134. For example, code generator 131 generates a plurality of equivalent blocks 626, which comprises equivalent blocks 212, 214, and 621; code generator 132 generates a plurality of equivalent blocks 627, which comprises equivalent blocks 612 and 622; and code generator 133 generates a plurality of equivalent blocks 628, which comprises equivalent blocks 613 and 623. This set of equivalent blocks is used by offline evaluation 110, as described previously.

A set of first coding scores, comprising a first coding score 636, a first coding score 637, and a first coding score 638 (which correspond to a respective one of code generator 131, 132, and 133) are weighted by weights 630 according to code utilities 253 and 254 (derived from, among other factors, task complexities). These weighted first scores are aggregated by CAT-RT/S aggregator 111 into first aggregate score 112, which is used to down-select first plurality of code generators 134 to second plurality of code generators 135.

In online evaluation 120, CAT-OP 500 produces an acceptance score 503 for each of code generators 131 and 132 (e.g., acceptance score 503a for code generators 132 is represented in FIG. 6 as acceptance score 503a). FIG. 6 shows the aggregation of acceptance score 503 and first aggregate score 112 into second aggregate score 122 by offline/online aggregator 121.

Figure 7:
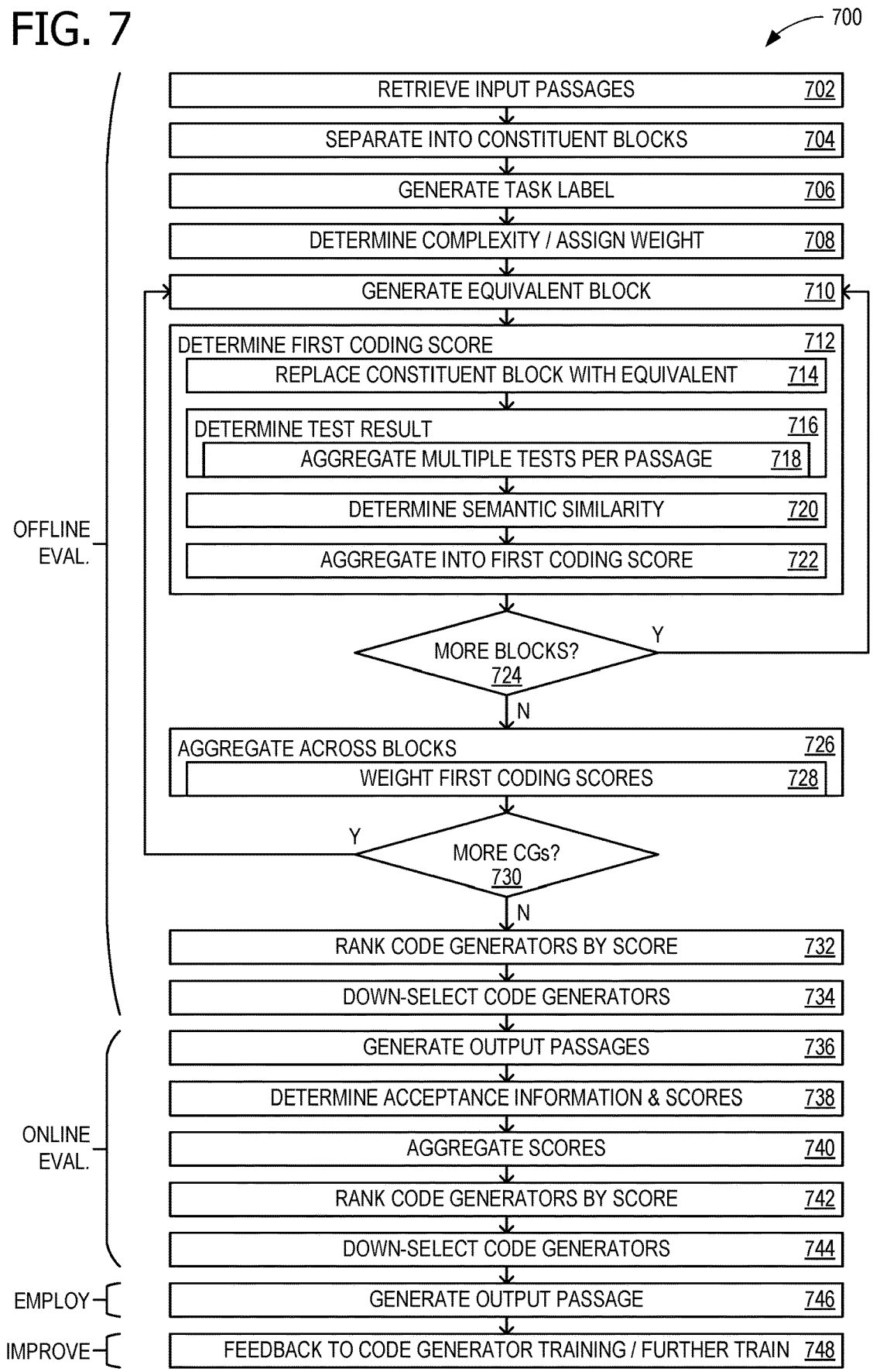
FIG. 7 shows a flowchart illustrating exemplary operations associated with the arrangement of FIG. 1.

FIG. 7 shows a flowchart 700 illustrating exemplary operations associated with examples of arrangement 100. In some examples, operations described for flowchart 700 are performed by computing device 900 of FIG. 9. Flowchart 700 commences with retrieving input passages of software code 151 and 152 and tests 161a-162b from source code repository 140, in operation 702.

Operation 704 uses a processor 914 (see FIG. 9) to separate each of plurality of input passages of software code 601 into plurality of constituent blocks 606 and 608. Operation 706 generating a corresponding task label (e.g., task labels 252 and 254) for at least some of the constituent blocks (at least each of the constituent blocks for which an equivalent block will be generated). Operation 708 determines a code utility (e.g., complexities 253 and 253) for at least some of the constituent blocks (at least each of the constituent blocks for which an equivalent block will be generated), and assigns weights (e.g., weights 630) based on at least the determined complexities.

Operations 710 and 712 are performed for each constituent block, for which an equivalent block is generated, for each code generator in first plurality of code generators 134. That is, operation 710 is the start of a two-tier nested loop. Operations 710 includes, for at least one constituent block of each plurality of constituent blocks 606 and 608, generating, with each code generator of first plurality of code generators 134, an equivalent block, thereby producing a plurality of equivalent blocks corresponding to each code generator.

Operation 712 determines, for each code generator (131-133), for each equivalent block in the plurality of equivalent blocks corresponding to the code generator, first coding score (636, 637, or 638). This is performed using operations 714-722. Operation 714 replaces, in the input passages of software code from which the equivalent block was generated, the constituent block with the equivalent block, thereby producing a modified passage. For example, in input passage of software code 151 from which equivalent block 212 was generated, constituent block 202 is replaced with equivalent block 212, thereby producing modified passage 251.

Operation 716 determines test result 302 of testing modified passage 251. In some examples, operation 716 includes operation 718, which performs plurality of tests 361 on modified passage 251 and aggregates test results 360a and 360b of plurality of tests 361 on modified passage 251. In such examples, test result 302 comprises an aggregation of test results 360a and 360b of plurality of tests 361. Operation 720 determines semantic similarity 402 between constituent block 202 and equivalent block 212, and operation 722 aggregates test result 302 with semantic similarity 402 into first coding score 636, for code generator 131. For code generator 132, test result 302 and semantic similarity 402 (for code generator 132) are aggregated into first coding score 637, and for code generator 133, test result 302 and semantic similarity 402 (for code generator 133) are aggregated into first coding score 638.

A decision operation 724 determines whether there are additional constituent blocks to replace with an equivalent block, for the current code generator. If so, flowchart 700 returns to operation 710. In the next pass-through operations 710-722, an additional equivalent block is generated for at least one additional constituent block (e.g., equivalent block 214 for constituent block 204). A second coding score is determined, for each code generator, for the additional equivalent blocks, Otherwise, operation 726 aggregates, for each code generator, first coding scores 636, 637, or 638 across the plurality of equivalent blocks corresponding to the code generator, into first aggregate score 112 for the code generator. In some examples, operation 726 further includes aggregating, for each code generator, second coding scores, across the plurality of additional equivalent blocks corresponding to the code generator, into the first aggregate score for the code generator. In some examples, as part of operation 726, operation 728 weights each first coding score (and second coding score) according to a code utility of its corresponding constituent block.

Decision operation 730 determines whether additional code generators are to be evaluated. If so, flowchart 700 returns to operation 710. Otherwise, operation 732 ranks first plurality of code generators 134 based on at least first aggregate scores 112. Operation 734 selects (down-selects) second plurality of code generators 135 from among first plurality of code generators 134, based on at least ranking 114 of first aggregate scores 112. Together, operations 702-734 comprise an offline evaluation process.

Operation 736 generates, with each code generator of second plurality of code generators 135, an output passage of software code (e.g., output passages of software code 511 and 521, for code generators 131 and 132, respectively). Operation 738 determines acceptance information 501 for each output passage of software code, and also determines, for each code generator of second plurality of code generators 135, acceptance score 503, based on at least acceptance information 501 for its output passage of software code.

For each code generator of second plurality of code generators 135, operation 740 aggregates first aggregate score 112 with acceptance score 503 into second aggregate score 122. Operation 742 ranks second plurality of code generators 135, based on at least second aggregate scores 122. Operation 744 includes, based on at least ranking 124, of second aggregate scores 122 for second plurality of code generators 135, selecting a top code generator (e.g., code generator 131) from among second plurality of code generators 135.

Code generator is used to produce source code in operation 746, by generating output passage of software code 153. Operation 748 feeds back first aggregate scores 112 for various code generator to trainer 160, and also feeds back second aggregate scores 122 to trainer 160. Trainer then further trains a select set of code generators.

Figure 8:
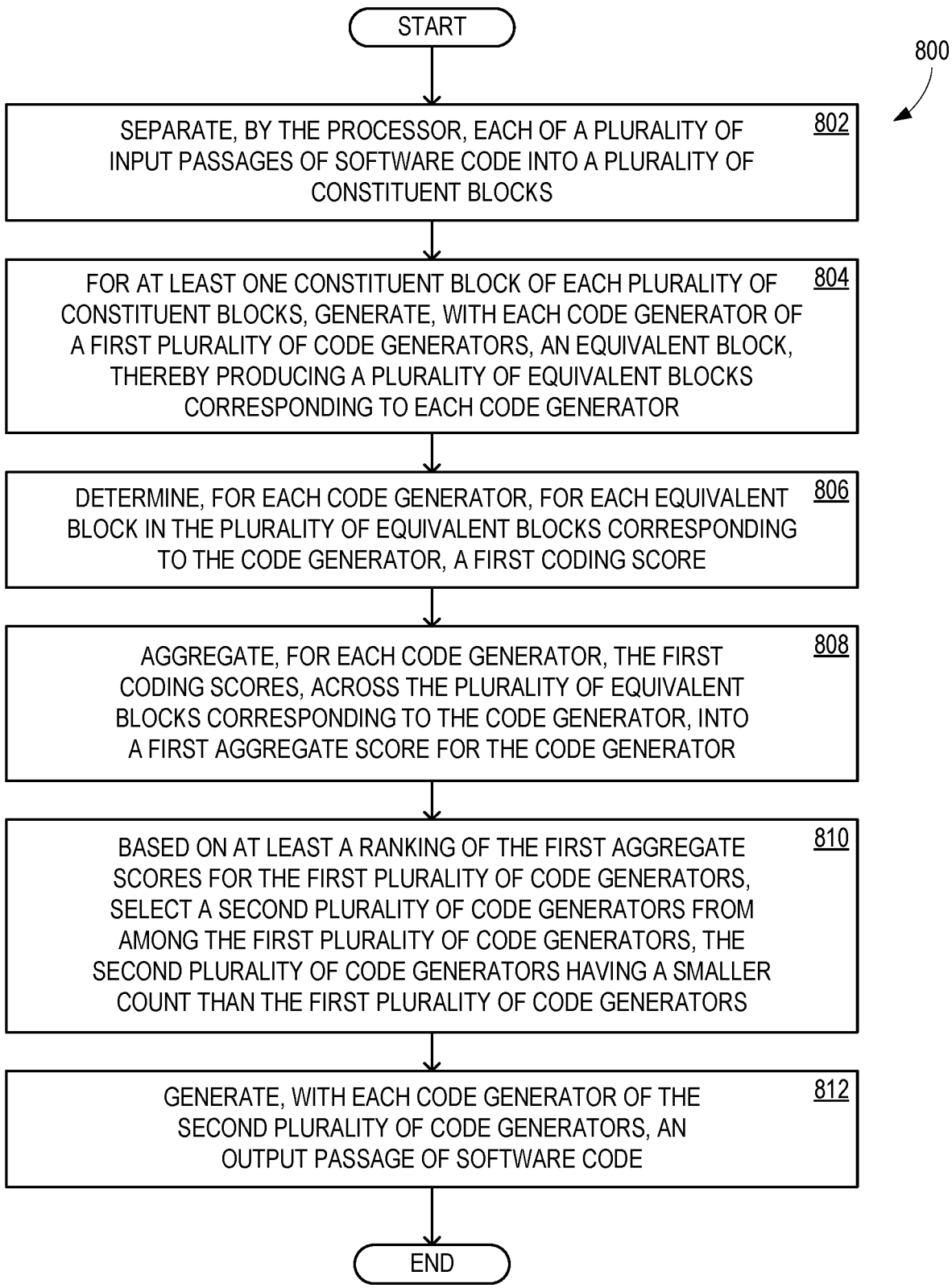
FIG. 8 shows another flowchart illustrating exemplary operations associated with the arrangement of FIG. 1.

FIG. 8 shows a flowchart 800 illustrating exemplary operations associated with examples of arrangement 100. In some examples, operations described for flowchart 800 are performed by computing device 900 of FIG. 9. Flowchart 800 commences with operation 802, which includes separating, by a processor, each of a plurality of input passages of software code into a plurality of constituent blocks.

Operation 804 includes, for at least one constituent block of each plurality of constituent blocks, generating, with each code generator of a first plurality of code generators, an equivalent block, thereby producing a plurality of equivalent blocks corresponding to each code generator. Operation 806 includes determining, for each code generator, for each equivalent block in the plurality of equivalent blocks corresponding to the code generator, a first coding score. Operation 808 includes aggregating, for each code generator, the first coding scores, across the plurality of equivalent blocks corresponding to the code generator, into a first aggregate score for the code generator.

Operation 810 includes, based on at least a ranking of the first aggregate scores for the first plurality of code generators, selecting a second plurality of code generators from among the first plurality of code generators, the second plurality of code generators having a smaller count than the first plurality of code generators. Operation 812 includes generating, with each code generator of the second plurality of code generators, an output passage of software code.

ADDITIONAL EXAMPLES

An example system comprises: a processor; and a computer storage medium storing instructions that are operative upon execution by the processor to: separate, by the processor, each of a plurality of input passages of software code into a plurality of constituent blocks; for at least one constituent block of each plurality of constituent blocks, generate, with each code generator of a first plurality of code generators, an equivalent block, thereby producing a plurality of equivalent blocks corresponding to each code generator; determine, for each code generator, for each equivalent block in the plurality of equivalent blocks corresponding to the code generator, a first coding score; aggregate, for each code generator, the first coding scores, across the plurality of equivalent blocks corresponding to the code generator, into a first aggregate score for the code generator; based on at least a ranking of the first aggregate scores for the first plurality of code generators, select a second plurality of code generators from among the first plurality of code generators, the second plurality of code generators having a smaller count than the first plurality of code generators; and generate, with each code generator of the second plurality of code generators, an output passage of software code.

An example method comprises: separating, by a processor, each of a plurality of input passages of software code into a plurality of constituent blocks; for at least one constituent block of each plurality of constituent blocks, generating, with each code generator of a first plurality of code generators, an equivalent block, thereby producing a plurality of equivalent blocks corresponding to each code generator; determining, for each code generator, for each equivalent block in the plurality of equivalent blocks corresponding to the code generator, a first coding score; aggregating, for each code generator, the first coding scores, across the plurality of equivalent blocks corresponding to the code generator, into a first aggregate score for the code generator; based on at least a ranking of the first aggregate scores for the first plurality of code generators, selecting a second plurality of code generators from among the first plurality of code generators, the second plurality of code generators having a smaller count than the first plurality of code generators; and generating, with each code generator of the second plurality of code generators, an output passage of software code.

One or more example computer storage devices has computer-executable instructions stored thereon, which, upon execution by a computer, cause the computer to perform operations comprising: separating, by a processor, each of a plurality of input passages of software code into a plurality of constituent blocks; for at least one constituent block of each plurality of constituent blocks, generating, with each code generator of a first plurality of code generators, an equivalent block, thereby producing a plurality of equivalent blocks corresponding to each code generator; determining, for each code generator, for each equivalent block in the plurality of equivalent blocks corresponding to the code generator, a first coding score; aggregating, for each code generator, the first coding scores, across the plurality of equivalent blocks corresponding to the code generator, into a first aggregate score for the code generator; based on at least a ranking of the first aggregate scores for the first plurality of code generators, selecting a second plurality of code generators from among the first plurality of code generators, the second plurality of code generators having a smaller count than the first plurality of code generators; and generating, with each code generator of the second plurality of code generators, an output passage of software code.

Alternatively, or in addition to the other examples described herein, examples include any combination of the following:
- for each output passage of software code, determining acceptance information;
- determining, for each code generator of the second plurality of code generators, an acceptance score based on at least the acceptance information for its output passage of software code;
- determining the first coding score comprises replacing, in the input passages of software code from which the equivalent block was generated, the constituent block with the equivalent block, thereby producing a modified passage;

determining the first coding score comprises determining a test result of testing the modified passage;

determining the test result comprises performing a plurality of tests on the modified passage;

the test result comprises an aggregation of test results of the plurality of tests;

determining the first coding score further comprises determining semantic similarity between the constituent block and the equivalent block;

determining the first coding score further comprises aggregating the test result with the semantic similarity into the first coding score;

aggregating the first coding scores into the first aggregate score comprises weighting each first coding score according to a code utility of its corresponding constituent block;

for at least one additional constituent block of each plurality of constituent blocks, generating, with each code generator of a first plurality of code generators, an additional equivalent block, thereby producing a plurality of additional equivalent blocks corresponding to each code generator;

determining, for each code generator, for each additional equivalent block in the plurality of equivalent blocks corresponding to the code generator, a second coding score;

aggregating, for each code generator, the second coding scores, across the plurality of additional equivalent blocks corresponding to the code generator, into the first aggregate score for the code generator;

for each constituent block, generating a corresponding task label;

determining a code utility of each constituent block;

based on at least the first aggregate scores, ranking the first plurality of code generators;

for each code generator of the second plurality of code generators, aggregating the first aggregate score with the acceptance score into a second aggregate score;

based on at least the second aggregate scores, ranking the second plurality of code generators; and based on at least the ranking of the second aggregate scores for the second plurality of code generators, selecting a top code generator from among the second plurality of code generators; generating, with the top code generator, an output passage of software code.

While the aspects of the disclosure have been described in terms of various examples with their associated operations, a person skilled in the art would appreciate that a combination of operations from any number of different examples is also within scope of the aspects of the disclosure.

Example Operating Environment

Figure 9:
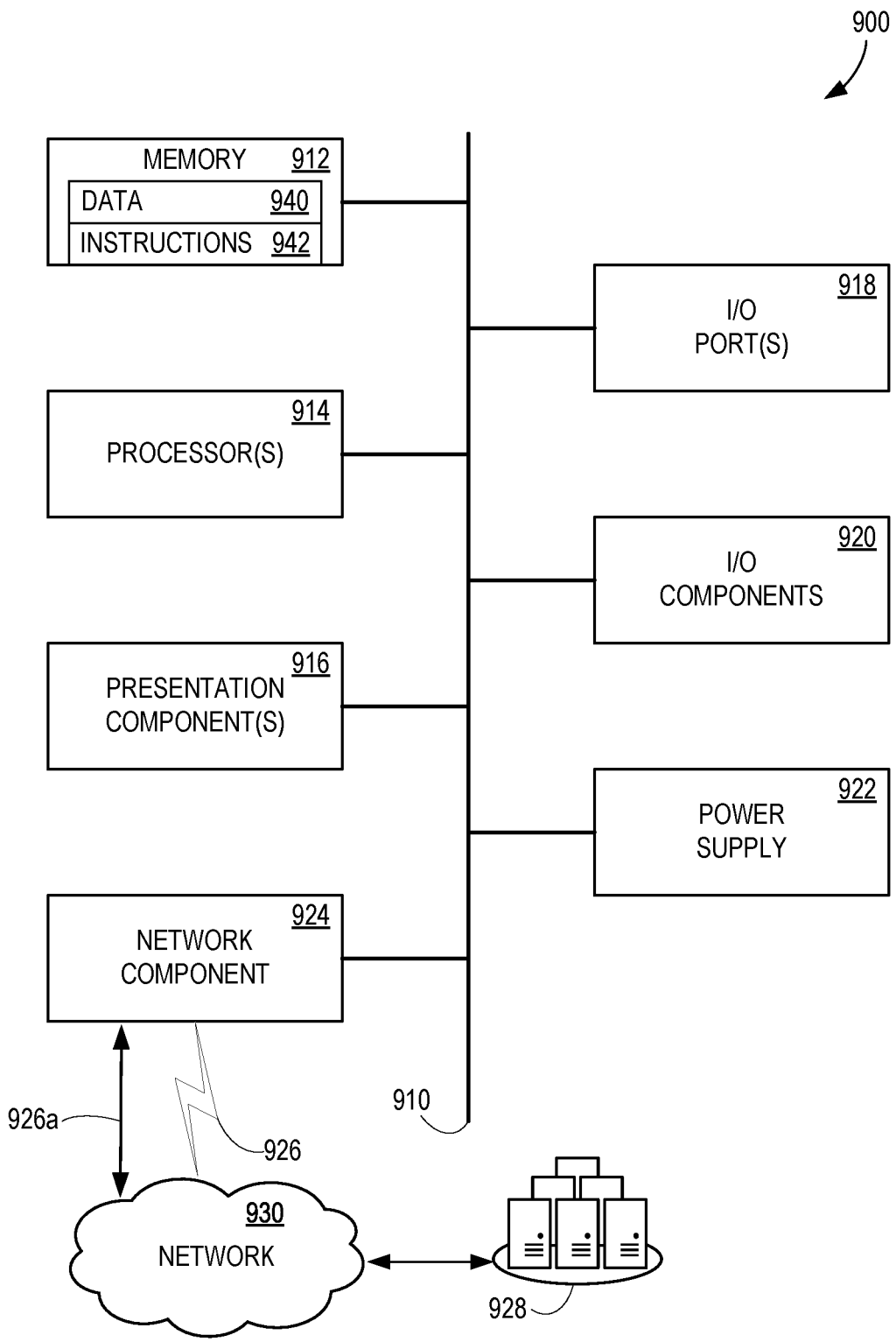
FIG. 9 is a block diagram of an example computing environment suitable for implementing some of the various examples disclosed herein.

FIG. 9 is a block diagram of an example computing device 900 for implementing aspects disclosed herein, and is designated generally as computing device 900. In some examples, one or more computing devices 900 are provided for an on-premises computing solution. In some examples, one or more computing devices 900 are provided as a cloud computing solution. In some examples, a combination of on-premises and cloud computing solutions are used. Computing device 900 is but one example of a suitable computing environment and is not intended to suggest any limitation as to the scope of use or functionality of the examples disclosed herein, whether used singly or as part of a larger set.

Neither should computing device 900 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 900 includes a bus 910 that directly or indirectly couples the following devices: memory 912, one or more processors 914, one or more presentation components 916, input/output (I/O) ports 918, I/O components 920, a power supply 922, and a network component 924. While computing device 900 is depicted as a seemingly single device, multiple computing devices 900 may work together and share the depicted device resources. For example, memory 912 may be distributed across multiple devices, and processor(s) 914 may be housed with different devices.

Bus 910 represents what may be one or more busses (such as an address bus, data bus, or a combination thereof). Although the various blocks of FIG. 9 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 9 and the references herein to a "computing device." Memory 912 may take the form of the computer storage media referenced below and operatively provide storage of computer-readable instructions, data structures, program modules and other data for computing device 900. In some examples, memory 912 stores one or more of an operating system, a universal application platform, or other program modules and program data. Memory 912 is thus able to store and access data 940 and instructions 942 that are executable by processor 914 and configured to carry out the various operations disclosed herein.

In some examples, memory 912 includes computer storage media. Memory 912 may include any quantity of memory associated with or accessible by computing device 900. Memory 912 may be internal to computing device 900 (as shown in FIG. 9), external to computing device 900 (not shown), or both (not shown). Additionally, or alternatively, memory 912 may be distributed across multiple computing devices 900, for example, in a virtualized environment in which instruction processing is carried out on multiple computing devices 900. For the purposes of this disclosure, "computer storage media," "computer-storage memory," "memory," "computer storage devices", and "memory devices" are synonymous terms for memory 912, and none of these terms include carrier waves or propagating signaling.

Processor(s) 914 may include any quantity of processing units that read data from various entities, such as memory 912 or I/O components 920. Specifically, processor(s) 914 are programmed to execute computer-executable instructions for implementing aspects of the disclosure. The instructions may be performed by the processor, by multiple processors within computing device 900, or by a processor external to the client computing device 900. In some examples, the processor(s) 914 are programmed to execute instructions such as those illustrated in the flow charts discussed below and depicted in the accompanying drawings. Moreover, in some examples, the processor(s) 914 represent an implementation of analog techniques to perform the operations described herein. For example, the operations may be performed by an analog client computing device 900 and/or a digital client computing device 900. Presentation component(s) 916 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 900, across a wired connection, or in other ways. I/O ports 918 allow computing device 900 to be logically coupled to other devices including I/O components 920, some of which may be built in. Example I/O components 920 include, for example but without limitation, a microphone, joystick, game pad, satellite dish, scanner, printer, wireless device, etc.

Computing device 900 may operate in a networked environment via the network component 924 using logical connections to one or more remote computers. In some examples, the network component 924 includes a network interface card and/or computer-executable instructions (e.g., a driver) for operating the network interface card. Communication between computing device 900 and other devices may occur using any protocol or mechanism over any wired or wireless connection. In some examples, network component 924 is operable to communicate data over public, private, or hybrid (public and private) using a transfer protocol, between devices wirelessly using short range communication technologies (e.g., near-field communication (NFC), Bluetooth branded communications, or the like), or a combination thereof. Network component 924 communicates over wireless communication link 926 and/or a wired communication link 926*a* to a remote resource 928 (e.g., a cloud resource) across network 930. Various different examples of communication links 926 and 926*a* include a wireless connection, a wired connection, and/or a dedicated link, and in some examples, at least a portion is routed through the internet.

Although described in connection with an example computing device 900, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer-readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer-readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

The invention claimed is:

1. A system comprising:
a processor; and
a computer storage medium storing instructions that are operative upon execution by the processor to:
based on at least a ranking of first aggregate scores for a first plurality of code generators, select a second plurality of code generators from among the first plurality of code generators, the second plurality of code generators having a smaller count than the first plurality of code generators;
generate, with each code generator of the second plurality of code generators, an output passage of software code;
for each output passage of software code, determine acceptance information;
determine, for each code generator of the second plurality of code generators, an acceptance score based on at least the acceptance information for its output passage of software code;
for each code generator of the second plurality of code generators, aggregate the first aggregate score with the acceptance score into a second aggregate score;
based on at least the second aggregate scores, rank the second plurality of code generators;
based on at least the ranking of the second aggregate scores for the second plurality of code generators, select a top code generator from among the second plurality of code generators; and
generate, with the top code generator, an output passage of software code.

2. The system of claim 1, wherein the instructions are further operative to:
further train at least a subset of the first plurality of code generators using the first aggregate scores and/or the second aggregate scores.

3. The system of claim 1, wherein the instructions are further operative to:
separate each of a plurality of input passages of software code into a plurality of constituent blocks;
for at least one constituent block of each plurality of constituent blocks, generate, with each code generator of the first plurality of code generators, an equivalent block, thereby producing a plurality of equivalent blocks corresponding to each code generator;
determine, for each code generator, for each equivalent block in the plurality of equivalent blocks corresponding to the code generator, a first coding score;
aggregate, for each code generator, the first coding scores, across the plurality of equivalent blocks corresponding to the code generator, into the first aggregate score for the code generator; and
rank the first aggregate scores.

4. The system of claim 3, wherein the instructions are further operative to:
for each output passage of software code, determine acceptance information; and
determine, for each code generator of the second plurality of code generators, an acceptance score based on at least the acceptance information for its output passage of software code.

5. The system of claim 3, wherein determining the first coding score comprises:
replacing, in the input passages of software code from which the equivalent block was generated, the constituent block with the equivalent block, thereby producing a modified passage; and
determining a test result of testing the modified passage.

6. The system of claim 5, wherein determining the first coding score further comprises:
determining semantic similarity between the constituent block and the equivalent block; and
aggregating the test result with the semantic similarity into the first coding score.

7. The system of claim 3, wherein aggregating the first coding scores into the first aggregate score comprises weighting each first coding score according to a code utility of its corresponding constituent block.

8. A computer-implemented method comprising:
based on at least a ranking of first aggregate scores for a first plurality of code generators, selecting a second plurality of code generators from among the first plurality of code generators, the second plurality of code generators having a smaller count than the first plurality of code generators;
generating, with each code generator of the second plurality of code generators, an output passage of software code;
for each output passage of software code, determining acceptance information;
determining, for each code generator of the second plurality of code generators, an acceptance score based on at least the acceptance information for its output passage of software code;
for each code generator of the second plurality of code generators, aggregating the first aggregate score with the acceptance score into a second aggregate score;
based on at least the second aggregate scores, ranking the second plurality of code generators;
based on at least the ranking of the second aggregate scores for the second plurality of code generators, selecting a top code generator from among the second plurality of code generators; and
generating, with the top code generator, an output passage of software code.

9. The computer-implemented method of claim 8, further comprising:
further training at least a subset of the first plurality of code generators using the first aggregate scores and/or the second aggregate scores.

10. The computer-implemented method of claim 8, further comprising:
separating each of a plurality of input passages of software code into a plurality of constituent blocks;

for at least one constituent block of each plurality of constituent blocks, generating, with each code generator of the first plurality of code generators, an equivalent block, thereby producing a plurality of equivalent blocks corresponding to each code generator;

determining, for each code generator, for each equivalent block in the plurality of equivalent blocks corresponding to the code generator, a first coding score;

aggregating, for each code generator, the first coding scores, across the plurality of equivalent blocks corresponding to the code generator, into the first aggregate score for the code generator; and ranking the first aggregate scores.

11. The computer-implemented method of claim 10, further comprising:

for each output passage of software code, determining acceptance information; and determining, for each code generator of the second plurality of code generators, an acceptance score based on at least the acceptance information for its output passage of software code.

12. The computer-implemented method of claim 10, wherein determining the first coding score comprises:

replacing, in the input passages of software code from which the equivalent block was generated, the constituent block with the equivalent block, thereby producing a modified passage; and determining a test result of testing the modified passage.

13. The computer-implemented method of claim 12, wherein determining the first coding score further comprises:

determining semantic similarity between the constituent block and the equivalent block; and aggregating the test result with the semantic similarity into the first coding score.

14. The computer-implemented method of claim 10, wherein aggregating the first coding scores into the first aggregate score comprises weighting each first coding score according to a code utility of its corresponding constituent block.

15. A computer storage device having computer-executable instructions stored thereon, which, on execution by a computer, cause the computer to perform operations comprising:

based on at least a ranking of first aggregate scores for a first plurality of code generators, selecting a second plurality of code generators from among the first plurality of code generators, the second plurality of code generators having a smaller count than the first plurality of code generators;

generating, with each code generator of the second plurality of code generators, an output passage of software code;

for each output passage of software code, determining acceptance information;

determining, for each code generator of the second plurality of code generators, an acceptance score based on at least the acceptance information for its output passage of software code;

for each code generator of the second plurality of code generators, aggregating the first aggregate score with the acceptance score into a second aggregate score;

based on at least the second aggregate scores, ranking the second plurality of code generators;

based on at least the ranking of the second aggregate scores for the second plurality of code generators, selecting a top code generator from among the second plurality of code generators; and generating, with the top code generator, an output passage of software code.

16. The computer storage device of claim 15, wherein the operations further comprise:

separating each of a plurality of input passages of software code into a plurality of constituent blocks;

for at least one constituent block of each plurality of constituent blocks, generating, with each code generator of the first plurality of code generators, an equivalent block, thereby producing a plurality of equivalent blocks corresponding to each code generator;

determining, for each code generator, for each equivalent block in the plurality of equivalent blocks corresponding to the code generator, a first coding score;

aggregating, for each code generator, the first coding scores, across the plurality of equivalent blocks corresponding to the code generator, into the first aggregate score for the code generator; and ranking the first aggregate scores.

17. The computer storage device of claim 16, wherein the operations further comprise:

for each output passage of software code, determining acceptance information; and determining, for each code generator of the second plurality of code generators, an acceptance score based on at least the acceptance information for its output passage of software code.

18. The computer storage device of claim 16, wherein determining the first coding score comprises:

replacing, in the input passages of software code from which the equivalent block was generated, the constituent block with the equivalent block, thereby producing a modified passage; and determining a test result of testing the modified passage.

19. The computer storage device of claim 18, wherein determining the first coding score further comprises:

determining semantic similarity between the constituent block and the equivalent block; and aggregating the test result with the semantic similarity into the first coding score.

20. The computer storage device of claim 16, wherein aggregating the first coding scores into the first aggregate score comprises weighting each first coding score according to a code utility of its corresponding constituent block.

* * * * *